United States Patent [19]

Botts et al.

[11] 3,769,123

[45] Oct. 30, 1973

[54] METHOD OF MAKING NON-CRACKING DECORATIVE SIDEWALLS OF TIRES

[75] Inventors: John W. Botts, Canton; Charles W. Roberts, Akron, both of Ohio

[73] Assignee: The Goodyear Tire & Rubber Company, Akron, Ohio

[22] Filed: Mar. 24, 1971

[21] Appl. No.: 127,482

[52] U.S. Cl............ 156/116, 152/354, 156/154, 156/385, 156/394, 264/315, 264/326
[51] Int. Cl............................................ B29h 21/02
[58] Field of Search.................. 156/116, 394, 133, 156/123, 154, 153, 385, 387, 388; 152/354; 264/315, 326

[56] References Cited
UNITED STATES PATENTS

| | | | |
|---|---|---|---|
| 1,448,286 | 3/1923 | Comstock | 156/116 |
| 2,679,277 | 5/1954 | Gray | 264/326 X |
| 3,382,120 | 5/1968 | Rudder | 156/116 |

Primary Examiner—Alfred L. Leavitt
Assistant Examiner—C. B. Cosby
Attorney—F. W. Brunner and Michael L. Gill

[57] ABSTRACT

A method of providing a decorative sidewall in a tire in which a sub-surface layer of rubber is provided in the sidewall and a surface layer of rubber is provided over the sub-surface layer, a raised circumferentially extending continuous rib is formed in the sidewall, said rib having a series of discontinuous depressions therein; the outer surface of the rib is ground slightly to expose the sub-surface layer in the rib while leaving the surface layer in the bases of the depressions.

The foregoing abstract is not to be taken as limiting the invention of this application, and in order to understand the full nature and extent of the technical disclosure of this application, reference must be made to the accompanying drawings and the following detailed description.

6 Claims, 4 Drawing Figures

METHOD OF MAKING NON-CRACKING DECORATIVE SIDEWALLS OF TIRES

This invention relates to pneumatic tires, and in particular to a method of providing large letters on the sidewall of the tire which have a contrasting appearance with respect to the rest of the tire.

In recent years, it has become popular to provide large raised white letters on the sidewall of a pneumatic tire. A difficulty, however, has arisen when such large raised white letters are provided on the sidewalls of radial ply tires. In these cases there is an increased tendency toward "sidewall cracking." "Sidewall cracking" is the phenomenon in which after a period of time, exposure to elements, and repeated flexing in use, the outer rubber cover on the sidewall begins to crack and results in a displeasing appearance. It is believed that this problem arises in radial ply tires because of the increased flexing of the sidewall due to the high carcass cord angle of between about 75° and 90°. The sidewall cracks appear to originate adjacent the raised letters where there is an abrupt change in rubber thickness and then propagate throughout the thin rubber layer in the sidewall.

By the present invention, this sidewall cracking problem is overcome by depressing large letters in a continuous raised circumferential rib. Each letter is surrounded by the heavy even gauge rubber of the rib, thereby eliminating the situation in which cracks can start at the base of a letter and propagate throughout the sidewall.

It is, therefore, an object of this invention to provide a pneumatic tire having large letters of contrasting appearance with other portions of the tire and reduced susceptibility to sidewall cracking.

It is a further object of this invention to provide a method of manufacturing a tire having large letters in the sidewall which have a contrasting appearance with respect to the area of the sidewall surrounding the letters.

Other objects will be in part apparent and in part pointed out more in detail hereinafter.

The invention accordingly consists in the features of construction, combination of elements and arrangement of parts which will be exemplified in the construction hereinafter set forth and the scope of the application of which will be indicated in the appended claims.

Figure 1:
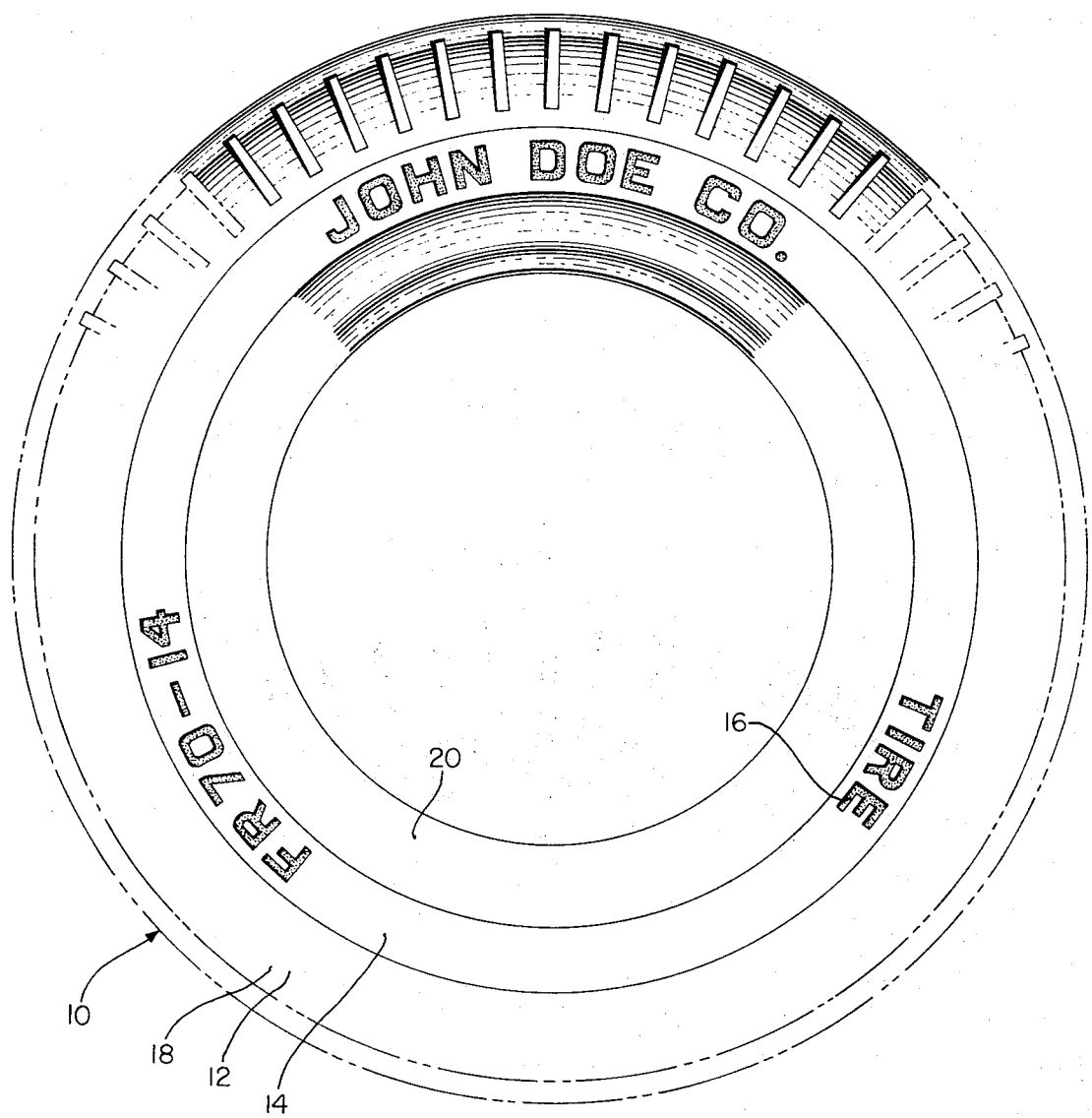
FIG. 1 is an elevational view of a pneumatic tire manufactured in accordance with the present invention.

With reference to the drawings and in particular FIG. 1, there is illustrated a tire 10 having a sidewall portion 12 on which there is formed a continuous raised circumferential rib 14 having a plurality of depressions or letters and figures 16 formed therein. The depressions 16 need not be letters and figures as illustrated in the embodiment of FIG. 1, but in any event, they are discontinuous in the circumferential direction and each depression is completely surrounded by a full depth portion of the rib 14. In the particular embodiment illustrated, the portions 18 and 20 of the sidewall 12 on opposite sides of the raised rib 14 are one color while the surface or face portion 15 of the raised rib is a second color and the depressions or letters and figures 16 are a third color.

Figure 2:
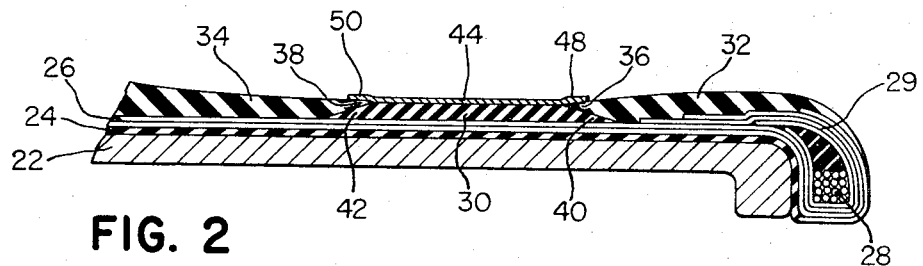
FIG. 2 is a fragmentary cross-sectional view of a portion of the tire in FIG. 1 illustrating the construction of the sidewall portion while the tire is still on the building drum.

With reference to FIG. 2, in the construction of a tire 10 the tire components are successively wrapped about a tire building drum 22. The particular tire illustrated includes a liner 24 and a radial ply carcass 26 wrapped circumferentially about the tire building drum 22. Beads 28 are provided at the axially outer ends of the drum 22 and the axially outer ends 29 of the carcass 26 are wrapped about the beads 28. In accordance with the present invention a strip or sub-surface layer 30 of vulcanizable elastomeric material is wrapped circumferentially about the carcass 26 in the area of the tire 10 which is destined to become the raised rib portion of the sidewall. Additional layers of sidewall rubber 32 and 34 are then wrapped circumferentially about the tire on opposite sides of the sub-surface layer 30 with their tapered adjacent edges 36 and 38 overlapping the tapered lateral edges 40 and 42 of the sub-surface layer 30. The sidewall layers 32 and 34 would normally be black while the sub-surface layer 30 would be of a contrasting color or appearance, for example, white or red. A thin surface layer 44 of vulcanizable elastomeric material is then wrapped circumferentially about the tire 10 in a central position with respect to the sub-surface layer 30. The layer 44 is narrower than the layer 30 and has its lateral edges 48 and 50 overlapping the lateral edges 36 and 38 of the layers 32 and 34. The surface layer 44 is of contrasting color or appearance with the sub-surface layer 30 and may or may not be the same in appearance as the sidewall layers 32 and 34.

Figure 3:
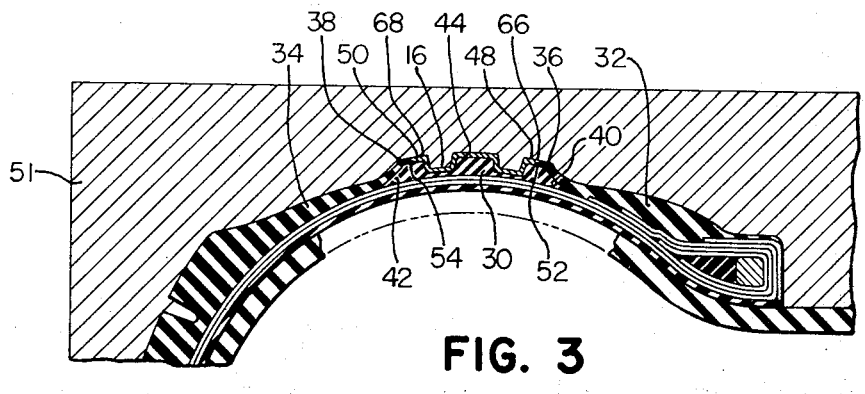
FIG. 3 is a fragmentary cross-sectional view of the tire of FIG. 1 illustrating the tire subsequent to shaping and curing.

As illustrated in FIG. 3, the tire 10 is then cured in a mold 51 under heat and pressure. The raised rib 14 and depressions 16 are formed in the sidewall 12 by the mold 51 and the tire is cured under heat and pressure. The depressions 16 are contained completely within the raised portion of the surface layer 44. Further, the lateral edges 48 and 50 of the surface layer 44 and the lateral edges 36 and 38, respectively, of the sidewall layers 32 and 34 overlap in the surface portion of the raised rib 14 on laterally opposite sides of the depressions 16. The lateral edges 48 and 50 of the surface layer 44 terminate in lateral directions short of the edges or corners 52 and 54 raised portion of the sub-surface layer 30. Also, the adjacent edges 36 and 38 of the sidewall portions 32 and 34 terminate short of the depressions 16.

Figure 4:
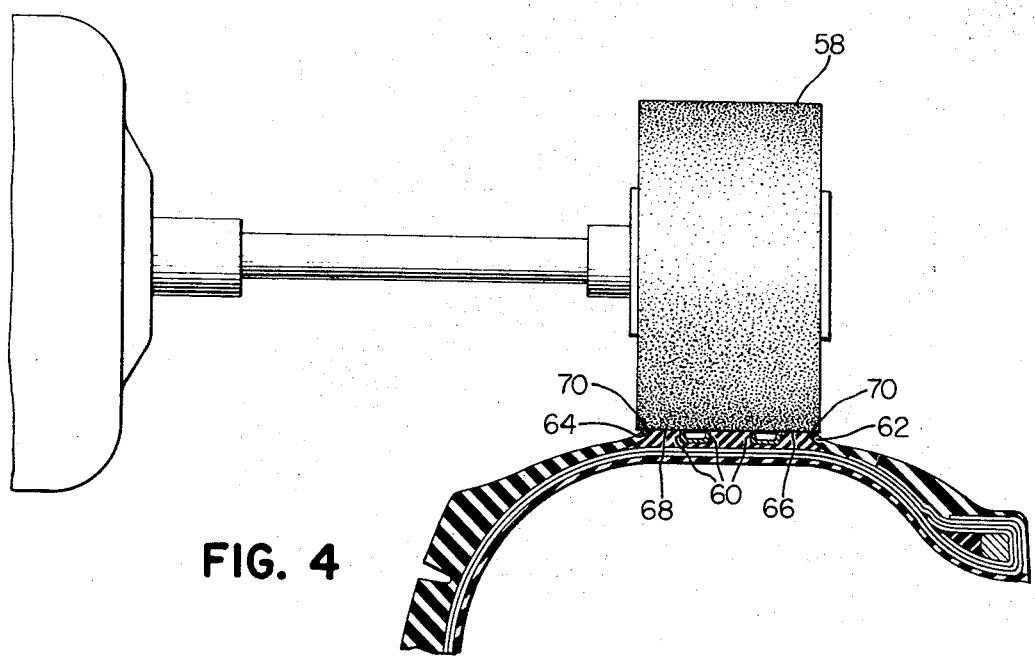
FIG. 4 is a cross-sectional view of the tire of FIG. 1 similar to that in FIG. 3 but illustrating the grinding operation to expose the contrasting color components of the sidewall.

With reference to FIG. 4, after curing, the tire 10 is removed from the mold, inflated and mounted on a spindle (not shown) for rotation about its rotational axis. The tire 10 is rotated about its rotational axis and a rotating grinding wheel 58 is applied to the raised rib portion 14 of the sidewall to remove a thin layer of elastomeric material from the generally flat circular surface thereof. A sufficient amount of rubber is removed from the rib 14 to expose the sub-surface layer 30 but not enough to remove the depressions 16. It can be seen, therefore, that the color or appearance of the circumferential rib will be that of the sub-surface layer 30 while the letters or depressions 16 will have the color of the surface layer 44. It will also be appreciated that the portions 60 of the surface layer 44 which outcrop to the surface of the rib 14 also have the color of the surface layer 44. It should further be noted that the lateral edges 70 of the rib 14 are bounded by the edge 62 and 64 of the sidewall rubber 32 and 34. This is accomplished by having the lateral edges 48 and 50 of the surface layer 44 and the edges 36 and 38 of the sidewall portions 32 and 34 terminate in the lateral spaces 66 and 68 between depressions 16 and the lateral edges of the rib 14.

It will be appreciated that the choice of colors or general appearance of the various portions of the sidewall is optional and the present invention is not directed to color combination but rather provides a method and means for manufacturing a tire having a raised rib of contrasting appearance or color with respect to adjacent sidewall portions and at the same time having depressed letters or figures of a third contrasting color or appearance. Further, a two color arrangement could be used. For example, the rib 14 could be white while the letters 16 and sidewall portions 18 and 20 black.

While certain representative embodiments and details have been shown for the purpose of illustrating the invention, it will be apparent to those skilled in this art that various changes and modifications may be made therein without departing from the spirit or scope of the invention.

What is claimed is:

1. A method of providing a decorative sidewall on a pneumatic tire comprising: providing a sub-surface layer of vulcanizable elastomeric material in said sidewall, providing a surface layer of vulcanizable elastomeric material over said sub-surface layer which is of a color contrasting with said sub-surface layer, forming a raised endless rib extending circumferentially of said tire on said sidewall and located at least in part in the area of said surface layer and said sub-surface layer, forming depressions in said raised rib which are discontinuous in a circumferential direction and in the form of large letters, said depressions being surrounded on all sides by a heavy even gauge of the rubber of said rib, vulcanizing the tire while maintaining said rib and depressions on the sidewall, and removing a layer of elastomeric material from the outer surface of said rib to expose said sub-surface layer in portions of said rib but not expose said sub-surface layer in the bases of said depression.

2. A method as claimed in claim 1, wherein said sub-surface layer of vulcanizable elastomeric material is provided in said sidewall by wrapping a strip of vulcanizable elastomeric material about said tire in said sidewall area and said surface layer of vulcanizable elastomeric material is provided by wrapping a strip of vulcanizable elastomeric material about said tire and over said sub-surface layer.

3. A method as claimed in claim 2, in which said sub-surface layer is wider than said surface layer and said surface layer is wrapped about said sub-surface layer in a central position with respect thereto, such that the lateral edges of said sub-surface layer extend laterally beyond the lateral edges of said surface layer and further including wrapping a pair of additional strips of elastomeric material about said tire in parallel spaced apart relationship with their adjacent edges overlapping the lateral edges of said surface layer, said additional layers being of a contrasting color to said subsurface layer and said surface layer.

4. A method as claimed in claim 3, wherein said depressions are confined to the space between said pair of additional strips.

5. A method as claimed in claim 4, wherein a layer of elastomeric material is removed from the outer surface of said raised rib by grinding the outer surface of said rib the entire length thereof.

6. A method as claimed in claim 2, wherein a layer of elastomeric material is removed from the outer surface of said raised rib by grinding the outer surface of said rib the entire length thereof.

* * * * *